United States Patent
Uhm et al.

(10) Patent No.: US 9,812,692 B2
(45) Date of Patent: Nov. 7, 2017

(54) LITHIUM SECONDARY BATTERY HAVING ENHANCED SAFETY

(71) Applicant: LG Chem, Ltd., Seoul (KR)

(72) Inventors: In Sung Uhm, Daejeon (KR); Je Young Kim, Daejeon (KR); Kyoung Ho Kim, Daejeon (KR); Ji Yoon Kwon, Daejeon (KR); Hoe Jin Hah, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/891,910

(22) PCT Filed: Jul. 29, 2014

(86) PCT No.: PCT/KR2014/006922
§ 371 (c)(1),
(2) Date: Nov. 17, 2015

(87) PCT Pub. No.: WO2015/016568
PCT Pub. Date: Feb. 5, 2015

(65) Prior Publication Data
US 2016/0149194 A1    May 26, 2016

(30) Foreign Application Priority Data

Jul. 30, 2013 (KR) .................. 10-2013-0089937

(51) Int. Cl.
*H01M 2/02* (2006.01)
*H01M 2/30* (2006.01)
(Continued)

(52) U.S. Cl.
CPC .......... *H01M 2/30* (2013.01); *H01M 2/0237* (2013.01); *H01M 2/22* (2013.01); *H01M 2/26* (2013.01);
(Continued)

(58) Field of Classification Search
CPC ............ H01M 2/22; H01M 2/26; H01M 2/30; H01M 2/348; H01M 2/0237;
(Continued)

(56) References Cited

U.S. PATENT DOCUMENTS 3,764,386 A    10/1973 Mix
2004/0092167 A1    5/2004 Barrault et al.
(Continued)

FOREIGN PATENT DOCUMENTS

CN    102484249 A    5/2012
CN    102664255 A    9/2012
(Continued)

OTHER PUBLICATIONS

English translation of KR Publication 10-2013-0004177, Jan. 2013.*
(Continued)

*Primary Examiner* — Brittany Raymond
(74) *Attorney, Agent, or Firm* — Lerner, David, Littenberg, Krumholz & Mentlik, LLP

(57) ABSTRACT

Disclosed is a secondary battery, wherein an electrode assembly including at least one positive electrode respectively having positive electrode tabs not coated with a positive electrode active material; at least one negative electrode respectively having negative electrode tabs not coated with a negative electrode active material; and at least one separator disposed between the positive electrode and the negative electrode is sealed with an electrolyte solution in a battery case, the positive electrode tabs and the negative electrode tabs are respectively connected to positive electrode lead and negative electrode lead protruded to the outside of a battery case, and at least one an electrode terminal selected from the group consisting of the positive electrode tabs, the negative electrode tabs, the positive
(Continued)

electrode lead and the negative electrode lead includes Wood's metal.

23 Claims, 1 Drawing Sheet

(51) Int. Cl.
| | |
|---|---|
| *H01M 4/58* | (2010.01) |
| *H01M 10/0525* | (2010.01) |
| *H01M 2/26* | (2006.01) |
| *H01M 2/22* | (2006.01) |
| *H01M 2/34* | (2006.01) |
| *H01M 10/0585* | (2010.01) |

(52) U.S. Cl.
CPC ........... *H01M 2/348* (2013.01); *H01M 4/582* (2013.01); *H01M 4/5825* (2013.01); *H01M 10/0525* (2013.01); *H01M 10/0585* (2013.01); *H01M 2200/103* (2013.01); *H01M 2220/20* (2013.01); *Y02T 10/7011* (2013.01)

(58) Field of Classification Search
CPC ......... H01M 10/0525; H01M 10/0585; H01M 4/582; H01M 4/5825; H01M 2200/103; H01M 2220/20; Y02T 10/7011
See application file for complete search history.

(56) References Cited

U.S. PATENT DOCUMENTS

| | | |
|---|---|---|
| 2006/0068292 A1 | 3/2006 | Mizutani et al. |
| 2011/0052981 A1 | 3/2011 | Lopez et al. |
| 2011/0086253 A1 | 4/2011 | Pompetzki et al. |
| 2011/0311869 A1 | 12/2011 | Oh et al. |
| 2012/0301763 A1* | 11/2012 | Tonomura ............... H01M 2/06 429/99 |
| 2013/0183588 A1 | 7/2013 | Oh et al. |
| 2013/0295444 A1 | 11/2013 | Kim et al. |
| 2013/0344379 A1 | 12/2013 | Yang et al. |

FOREIGN PATENT DOCUMENTS

| | | |
|---|---|---|
| EP | 1645646 A1 | 4/2006 |
| JP | 08-050920 | 2/1996 |
| JP | 2007066616 A | 3/2007 |
| JP | 2011519124 A | 6/2011 |
| JP | 2012185938 A | 9/2012 |
| JP | 2013520782 A | 6/2013 |
| JP | 2013539586 A | 10/2013 |
| JP | 2014520367 A | 8/2014 |
| KR | 20040110333 A | 12/2004 |
| KR | 20100008591 A | 1/2010 |
| KR | 20110097719 A | 8/2011 |
| KR | 20120066363 A | 6/2012 |
| KR | 10-2013-0004177 * | 1/2013 |
| KR | 20130004177 A | 1/2013 |
| KR | 20130040975 A | 4/2013 |
| KR | 10-2013-0064091 * | 6/2013 |
| KR | 20130064091 A | 6/2013 |
| WO | 2012118127 A1 | 9/2012 |

OTHER PUBLICATIONS

English translation of KR Publication 10-2013-0064091, Jun. 2013.*

International Search Report for Application No. PCT/KR2014/006922 dated Nov. 7, 2014.

Extended European Search Report for Application No. 14831303.4 dated Nov. 7, 2016.

* cited by examiner

[Fig. 1]
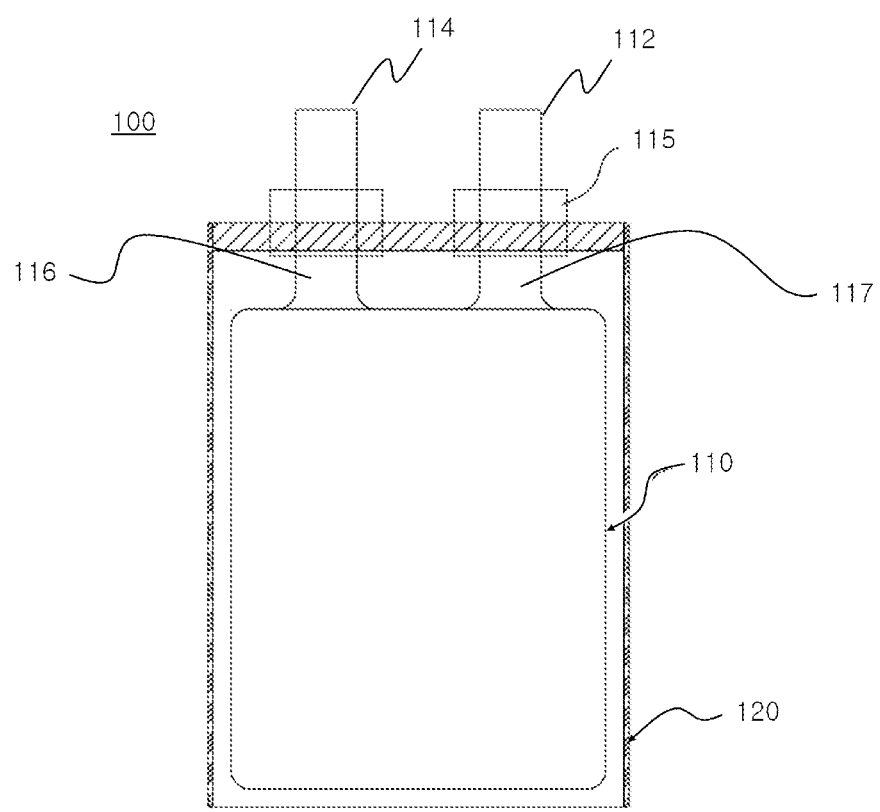

LITHIUM SECONDARY BATTERY HAVING ENHANCED SAFETY

CROSS REFERENCE TO RELATED APPLICATIONS

The present application is a national phase entry under 35 U.S.C. §371 of International Application No. PCT/KR2014/006922, filed Jul. 29, 2014, which claims priority from Korean Patent Application No. 10-2013-0089937, filed Jul. 30, 2013, the disclosures of which are incorporated herein by reference.

TECHNICAL FIELD

The present invention relates to a lithium secondary battery having enhanced safety.

BACKGROUND ART

As mobile device technology continues to develop and demand therefor continues to increase, demand for secondary batteries as energy sources is rapidly increasing. Accordingly, much research into secondary batteries which may satisfy various demands is underway.

Secondary batteries, which have superior electrical characteristics such as high capacity and high output, attract much interest as an energy source of mobile and wireless electronics such as cellular phones, digital cameras, PDA, laptops, etc., and power devices such as electric bicycles (E-bike), electric vehicles (EV), hybrid electric vehicles (HEV), etc.

However, in secondary batteries, decomposition of an active material, an electrolyte, etc. as battery components is caused in abnormal operation states such as overcharge, overdischarge, exposure to high temperature, short circuit, etc., and thus, heat and gas are generated. Accordingly, high temperature and high pressure are caused, and thus, decomposition is further accelerated, thereby leading to fire or explosion.

Further, generators or electrical connection elements, etc. of secondary batteries are slowly degraded due to continuous use, namely, continuous charge and discharge processes. For example, degradation of a generator leads to gas generation through decomposition of electrode materials, electrolyte, etc. Accordingly, a battery cell (can, pouch type case) slowly expands, more pressure is added to an expanded secondary battery in a limited case space, and risks such as fire and explosion may significantly increase under an abnormal operation condition.

Therefore, there is an urgent need for technology to resolve the problems of secondary batteries.

DISCLOSURE

Technical Problem

Therefore, the present invention has been made to solve the above and other technical problems that have yet to be resolved.

As a result of a variety of extensive and intensive studies and experiments, the inventors of the present invention confirmed that desired effects may be accomplished when an electrode terminal of a secondary battery is composed of Wood's metal, as described below, thus completing the present invention.

Technical Solution

In accordance with one aspect of the present invention, provided is a secondary battery, wherein an electrode assembly including at least one positive electrode respectively having positive electrode tabs not coated with a positive electrode active material; at least one negative electrode respectively having negative electrode tabs not coated with a negative electrode active material; and at least one separator disposed between the positive electrode and the negative electrode is sealed with an electrolyte solution in a battery case, the positive electrode tabs and the negative electrode tabs are respectively connected to positive electrode lead and negative electrode lead protruded to the outside of a battery case, and at least one electrode terminal selected from the group consisting of the positive electrode tabs, the negative electrode tabs, the positive electrode lead and the negative electrode lead includes Wood's metal.

The Wood's metal is a material melt at a melting point of 80° C. to 400° C., particularly a melting point of 200° C. or less. When temperature of the secondary battery largely increases according to overcharge or external short circuit, or temperature increases to a melting point or more of Wood's metal due to rapid resistance decrease of an electrode terminal, Wood's metal constituting the electrode terminal is melted, leading to short circuit and insulation of the secondary battery. Accordingly, it may be fundamentally blocked that the secondary battery is charged or electric power is outwardly supplied.

In a non-limiting embodiment, Wood's metal is an alloy of at least one metal selected from the group consisting of bismuth (Bi), lead (Pb), tin (Sn), and cadmium (Cd), but the present invention is not limited thereto.

In order to enhance conductivity, the electrode terminal comprising Wood's metal may be plated with aluminum (Al), copper (Cu) or nickel (Ni).

In a non-limiting embodiment, the electrode terminal including Wood's metal may be positive electrode tabs and/or a positive electrode lead, and Wood's metal may be composed of an alloy of Bi and Pb, or an alloy of Bi and Sn, but the present invention is not limited thereto.

In addition, the positive electrode tabs and/or the positive electrode lead may be plated with aluminum (Al).

In another non-limiting embodiment, the electrode terminal including Wood's metal may be negative electrode tabs and/or a negative electrode lead, and Wood's metal may be an alloy of Bi and Pb, but the present invention is not limited thereto.

In addition, the negative electrode tabs and/or the negative electrode lead may be plated with copper (Cu) or nickel (Ni).

In a non-limiting embodiment, Bi and Pb may be present in a molar ratio of 40:60 to 60:40. In addition, Bi and Sn may be present in a molar ratio of 50:50 to 30:70. The inventors of the present application confirmed that, when compositions of Wood's metal alloys are outside the composition ratios, Wood's metals are not melted before ignition of a secondary battery, and thus, safety of the secondary battery according to overcharge or external short circuit might not be guaranteed.

Meanwhile, the positive electrode active material may include a lithium transition metal oxide represented by Formula 1 or 2 below.

$$Li_xM_yMn_{2-y}O_{4-z}A_z \qquad (1),$$

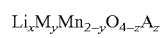

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, and $0 \leq z < 0.2$.

$$(1-x)\text{LiM}'\text{O}_{2-y}\text{A}_{y}\text{-}x\text{Li}_2\text{MnO}_{3-y'}\text{A}_{y'} \quad (2),$$

wherein M' is $\text{Mn}_a\text{M}_b$;

M is at least one selected from the group consisting of Ni, Ti, Co, Al, Cu, Fe, Mg, B, Cr, Zr, Zn and Period II transition metals;

A is at least one selected from the group consisting of anions such as $\text{PO}_4$, $\text{BO}_3$, $\text{CO}_3$, F and $\text{NO}_3$; and $0 < x < 1$, $0 < y \leq 0.02$, $0 < y' \leq 0.02$, $0.5 \leq a \leq 1.0$, $0 \leq b \leq 0.5$, and $a+b=1$.

The negative electrode active material may include a carbon-based material and/or Si.

In a non-limiting embodiment, the battery case may be composed of a laminate sheet including a resin layer and a metal layer.

In a non-limiting embodiment, the secondary battery may be a lithium ion battery, a lithium ion polymer battery or a lithium polymer battery.

Such a secondary battery may include a positive electrode, a negative electrode, a separator disposed between the positive electrode and the negative electrode, and a lithium salt-containing non-aqueous electrolyte. A structure and other components of the secondary battery are described in detail below.

First, FIG. 1 illustrates a secondary battery according to the present invention.

Referring to FIG. 1, a secondary battery 100 includes the electrode assembly 110 in which at least one positive electrode and negative electrode (not shown) respectively coated with a positive electrode active material and a negative electrode active material are layered, the positive electrode tabs 117 extended from a positive electrode plate of the electrode assembly 110 and negative electrode tabs 116 extended from a negative electrode plate of the electrode assembly, the electrode leads 112 and 114 which are respectively welded to electrode tabs and extended to the outside, the insulation film 115 at some upper and lower sides of the electrode leads 112 and 114 in order to increase hermeticity of the battery case and simultaneously secure a insulation state, and the pouch type case 120 in which the electrode assembly is accommodated and outer circumference sides are thermally welded so that external sides of the electrode assembly are completely adhered. Here, the positive electrode tabs 117 and the negative electrode tabs 116 are composed of alloys of Bi and Pb as Wood's metals. In addition, in order to enhance conductivity, the positive electrode tabs 117 and the negative electrode tabs 116 are plated with aluminum (Al).

Here, in an embodiment, the positive electrode tabs and the negative electrode tabs are composed of alloys of Bi and Pb as Wood's metals, but the present invention is not limited thereto. For example, any one electrode tab type of the positive electrode tabs and the negative electrode tabs may be composed of Wood's metal, and the other electrode tab type may be composed of a different material such as copper (Cu) or aluminum, etc., which is not Wood's metal. Of course, the electrode leads also may be composed of Wood's metal.

As described above, in a secondary battery according to the present invention, when temperature of the secondary battery greatly increases according to overcharge or external short circuit, or temperature increases to a melting point or more of Wood's metal due to rapid resistance decrease of an electrode terminal, Wood's metal constituting the electrode terminal is melted, leading to short circuit and insulation of the secondary battery. Accordingly, it may be fundamentally blocked that the secondary battery is charged or electric power is outwardly supplied, and safety of the secondary battery may be significantly enhanced.

Meanwhile, the positive electrode is prepared by drying after coating a mixture of a positive electrode active material, a conductive material and a binder, as an electrode mixture, on a positive electrode current collector. In this case, as desired, the mixture may further include a filler.

The positive electrode active material may include, other than a lithium transition metal oxide represented by Formula 1 or 2 below, layered compounds such as lithium cobalt oxide ($\text{LiCoO}_2$) and lithium nickel oxide ($\text{LiNiO}_2$) or compounds substituted with one or more transition metals; lithium manganese oxides represented by $\text{Li}_{1+x}\text{Mn}_{2-x}\text{O}_4$ where $0 \leq x \leq 0.33$, such as $\text{LiMn}_2\text{O}_3$, $\text{LiMn}_2\text{O}_3$, and $\text{LiMnO}_2$; lithium copper oxide ($\text{Li}_2\text{CuO}_2$); vanadium oxides such as $\text{LiV}_3\text{O}_8$, $\text{LiV}_3\text{O}_4$, $\text{V}_2\text{O}_5$, and $\text{Cu}_2\text{V}_2\text{O}_7$; Ni-site type lithium nickel oxides having the formula $\text{LiNi}_{1-x}\text{M}_x\text{O}_2$ where M=Co, Mn, Al, Cu, Fe, Mg, B, or Ga, and $0.01 \leq x \leq 0.3$; lithium manganese composite oxides having the formula $\text{LiMn}_{2-x}\text{M}_x\text{O}_2$ where M=Co, Ni, Fe, Cr, Zn, or Ta, and $0.01 \leq x \leq 0.1$ or the formula $\text{Li}_2\text{Mn}_3\text{MO}_8$ where M=Fe, Co, Ni, Cu, or Zn; spinel-structure lithium manganese composite oxides represented by $\text{LiNi}_x\text{Mn}_{2-x}\text{O}_4$; $\text{LiMn}_2\text{O}_4$ where some of the Li atoms are substituted with alkaline earth metal ions; disulfide compounds; $\text{Fe}_2(\text{MoO}_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon-based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$ The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_{2C}F_3)_2$, or the like to a mixed solvent including EC or PC, which is a high dielectric solvent and a cyclic carbonate, and DEC, DMC, or EMC, which is a low viscosity solvent and a linear carbonate.

The present invention provides a battery module including the secondary battery as a unit cell, a battery pack including the battery module, and a device including the battery pack as a power source.

In this regard, In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a schematic view of a secondary battery according to the present invention.

MODE FOR INVENTION

Now, the present invention will be described in more detail with reference to the accompanying drawings. These examples are provided for illustrative purposes only and should not be construed as limiting the scope and spirit of the present invention.

Example 1

An electrode assembly including a positive electrode tab and a negative electrode tab composed of an alloy including Bi and Pb in a molar ratio of 40:60 was embedded in a pouch type secondary battery, thereby manufacturing a secondary battery.

Example 2

A secondary battery was manufactured in the same manner as in Example 1, except that a positive electrode tab and a negative electrode tab were composed of an alloy including Bi and Pb in a molar ratio of 60:40.

Example 3

A secondary battery was manufactured in the same manner as in Example 1, except that a positive electrode tab was composed of an alloy including Bi and Sn in a molar ratio of 50:50.

Example 4

A secondary battery was manufactured in the same manner as in Example 1, except that a positive electrode tab was composed of an alloy including Bi and Sn in a molar ratio of 30:70.

Comparative Example 1

A secondary battery was manufactured in the same manner as in Example 1, except that a positive electrode tab and negative electrode tab were composed of alloy including Bi and Pb in a molar ratio of 70:30.

Comparative Example 2

A secondary battery was manufactured in the same manner as in Example 1, except that a positive electrode tab and a negative electrode tab were composed of alloy including Bi and Pb in a molar ratio of 30:70.

Comparative Example 3

A secondary battery was manufactured in the same manner as in Example 1, except that a positive electrode tab was composed of an alloy including Bi and Sn in a molar ratio of 20:80.

Comparative Example 4

A secondary battery was manufactured in the same manner as in Example 1, except that a positive electrode tab was composed of an alloy including Bi and Sn in a molar ratio of 80:20.

Comparative Example 5

A secondary battery was manufactured in the same manner as in Example 1, except that a positive electrode tab and a negative electrode tab were compose of only Bi.

Comparative Example 6

A secondary battery was manufactured in the same manner as in Example 1, except that a positive electrode tab was composed of aluminum and a negative electrode tab was composed of copper.

Experimental Example 1

In order to perform safety tests according to overcharge of secondary batteries according to Examples 1 to 4 and Comparative Examples 1 to 6, each of the secondary batteries was charged at 6.3V CC/CV under conditions of 0% SOC and 1 C, and a 6.3 V overcharge state was maintained for two hours. Results are summarized in Table 1 below.

TABLE 1

| | |
|---|---|
| Example 1 | Disconnection of positive electrode tab at 121° C. |
| Example 2 | Disconnection of positive electrode tab at 81° C. |
| Example 3 | Disconnection of positive electrode tab at 138° C. |
| Example 4 | Disconnection of positive electrode tab at 142° C. |
| Comparative Example 1 | Disconnection of positive electrode tab does not occur, cell ignition |
| Comparative Example 2 | Disconnection of positive electrode tab does not occur, cell ignition |
| Comparative Example 3 | Disconnection of positive electrode tab does not occur, cell ignition |
| Comparative Example 4 | Disconnection of positive electrode tab does not occur, cell ignition |
| Comparative Example 5 | Disconnection of positive electrode tab does not occur, cell ignition |
| Comparative Example 6 | Disconnection of positive electrode tab does not occur, cell ignition |

Referring to Table 1, it can be confirmed that, in the cases of Examples 1 to 4, the positive electrode tabs composed of Wood's metal alloy were melted and disconnected at 200° C. or less having a high cell ignition risk according to overcharge, whereby charge of the secondary batteries was stopped and, as a result, cell ignition according to overcharge may be prevented. On the other hand, it can be confirmed that, in the secondary batteries according to Comparative Examples 1 to 4 which included Wood's metal alloys composed of compositions that were different from Examples 1 to 4, the secondary battery according to Comparative Example 5 which used only Bi as Wood's metal, and the secondary battery according to Comparative Example 6 which did not include Wood's metal, cell ignition of the positive electrode tabs proceeded without disconnection.

Experimental Example 2

In order to perform a safety test according to short circuit of the secondary batteries manufactured according to Examples 1 to 4 and Comparative Examples 1 to 6, the secondary batteries were subjected to short circuit of 0.1 V or less under conditions of SOC 100%, and 1 ohm or less at room temperature. Results are summarized in Table 2 below.

TABLE 2

| | |
|---|---|
| Example 1 | Disconnection of positive electrode tab at 118° C. |
| Example 2 | Disconnection of positive electrode tab at 88° C. |
| Example 3 | Disconnection of positive electrode tab at 130° C. |
| Example 4 | Disconnection of positive electrode tab at 139° C. |
| Comparative Example 1 | Disconnection of positive electrode tab does not occur, cell ignition |
| Comparative Example 2 | Disconnection of positive electrode tab does not occur, cell ignition |
| Comparative Example 3 | Disconnection of positive electrode tab does not occur, cell ignition |
| Comparative Example 4 | Disconnection of positive electrode tab does not occur, cell ignition |
| Comparative Example 5 | Disconnection of positive electrode tab does not occur, cell ignition |
| Comparative Example 6 | Disconnection of positive electrode tab does not occur, cell ignition |

Referring to Table 2, it can be confirmed that, when the secondary battery according to Examples 1 to 4 were subjected to external short circuit, positive electrode tabs composed of Wood's metal alloy were melted and disconnected at 200° C. or less having a high cell ignition risk, and thus, cell ignition may be prevented. On the other hand, it can be confirmed that, in the secondary batteries according to Comparative Examples 1 to 6, the positive electrode tabs or the negative electrode tabs were not melted, and thus, cell ignition may not be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since, in a secondary battery according to the present invention, electrode terminals are composed of Wood's metal having a low melting point, Wood's metal is melted and a current carrying function of the electrode terminals is lost, when temperature of the secondary battery is abnormal. Accordingly, safety of the secondary battery may be enhanced.

The invention claimed is:

1. A secondary battery, wherein an electrode assembly includes at least one positive electrode respectively having positive electrode tabs not coated with a positive electrode active material; at least one negative electrode respectively having negative electrode tabs not coated with a negative electrode active material; and at least one separator disposed between the positive electrode and the negative electrode and sealed with an electrolyte solution in a battery case, the positive electrode tabs and the negative electrode tabs are respectively connected to positive electrode lead and negative electrode lead protruded to the outside of a battery case, and at least one electrode terminal selected from the group consisting of the positive electrode tabs, and the negative electrode tabs comprises Wood's metal, and
wherein the Wood's metal is an alloy of Bi and Pb, or an alloy of Bi and Sn.

2. The secondary battery according to claim 1, wherein a melting point of the Wood's metal is 80° C. to 400° C.

3. The secondary battery according to claim 1, wherein the electrode terminal comprising Wood's metal is plated with aluminum (Al), copper (Cu) or nickel (Ni).

4. The secondary battery according to claim 1, wherein the electrode terminal comprising Wood's metal is positive electrode tabs.

5. The secondary battery according to claim 4, wherein the Wood's metal is an alloy of Bi and Pb, or an alloy of Bi and Sn.

6. The secondary battery according to claim 5, wherein the Bi and Pb are present in a molar ratio of 40:60 to 60:40.

7. The secondary battery according to claim 5, wherein the Bi and Sn are present in a molar ratio of 50:50 to 30:70.

8. The secondary battery according to claim 4, wherein the positive electrode tabs are plated with aluminum (Al).

9. The secondary battery according to claim 1, wherein the electrode terminal comprising Wood's metal is negative electrode tabs.

10. The secondary battery according to claim 9, wherein the Wood's metal is an alloy of Bi and Pb.

11. The secondary battery according to claim 10, wherein the Bi and Pb are present in a molar ratio of 40:60 to 60:40.

12. The secondary battery according to claim 9, wherein the negative electrode tabs are plated with copper (Cu) or nickel (Ni).

13. The secondary battery according to claim 1, wherein the positive electrode active material comprises a lithium transition metal oxide represented by Formula 1 or 2 below:

$$Li_xM_yMn_{2-y}O_{4-z}A_z \quad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;
A is at least one monovalent or divalent anion; and $$0.9 \leq x \leq 1.2, \ 0 < y < 2, \text{ and } 0 \leq z < 0.2,$$

$$(1-x)LiM'O_{2-y}A_{y'}-xLi_2MnO_{3-y'}A_{y'} \quad (2),$$

wherein M' is $Mn_aM_b$;
M is at least one selected from the group consisting of Ni, Ti, Co, Al, Cu, Fe, Mg, B, Cr, Zr, Zn and Period II transition metals;
A is at least one selected from the group consisting of anions such as $PO_4$, $BO_3$, $CO_3$, F and $NO_3$; and $$0 < x < 1, \ 0 < y \leq 0.02, \ 0 < y' \leq 0.02, \ 0.5 \leq a \leq 1.0, \ 0 \leq b \leq 0.5,$$
$$\text{and } a+b=1.$$

14. The secondary battery according to claim 1, wherein the negative electrode active material comprises a carbon-based material and/or Si.

15. The secondary battery according to claim 1, wherein the battery case is composed of a laminate sheet comprising a resin layer and a metal layer.

16. The secondary battery according to claim 1, wherein the secondary battery is a lithium ion battery, a lithium ion polymer battery or a lithium polymer battery.

17. The secondary battery according to claim 1, wherein at least one electrode terminal selected from the group consisting of the positive electrode lead and the negative electrode lead further comprises Wood's metal.

18. The secondary battery according to claim 17, wherein the positive electrode tabs and/or the positive electrode lead are plated with aluminum (Al).

19. The secondary battery according to claim 17, wherein the negative electrode tabs and/or the negative electrode lead are plated with copper (Cu) or nickel (Ni).

20. A battery module comprising the secondary battery according to claim 1 as a unit cell.

21. The battery pack comprising the battery module according to claim 20.

22. A device comprising the battery pack according to claim 21 as a power source.

23. The device according to claim 22, wherein the device is an electric vehicle, a hybrid electric vehicle, a plug-in hybrid electric vehicle or a system for storing power.

* * * * *